Jan. 2, 1940.   K. KLEMSCHOFSKI ET AL   2,185,597
MACHINE FOR THE MANUFACTURE OF POROUS PIPE
Filed July 10, 1937   8 Sheets-Sheet 2

INVENTORS
KARL KLEMSCHOFSKI
PAUL VRANA
BY
Philip J. McKean
ATTORNEY.

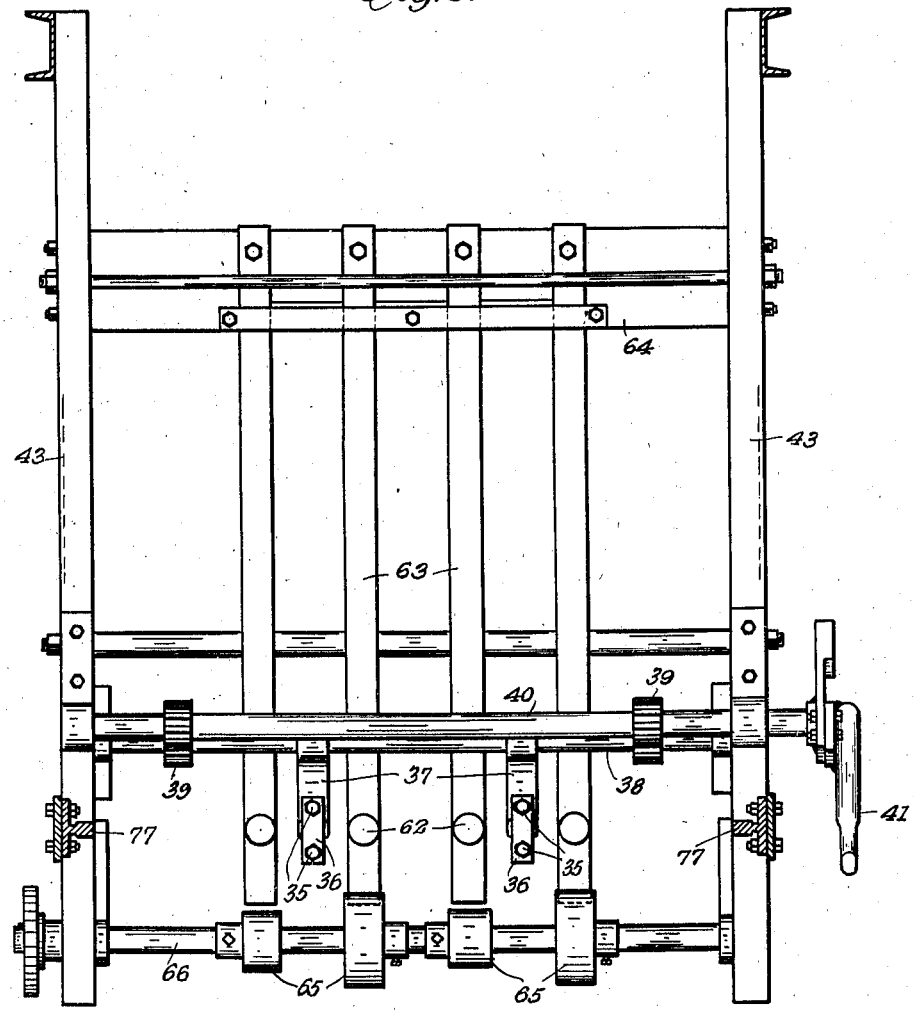

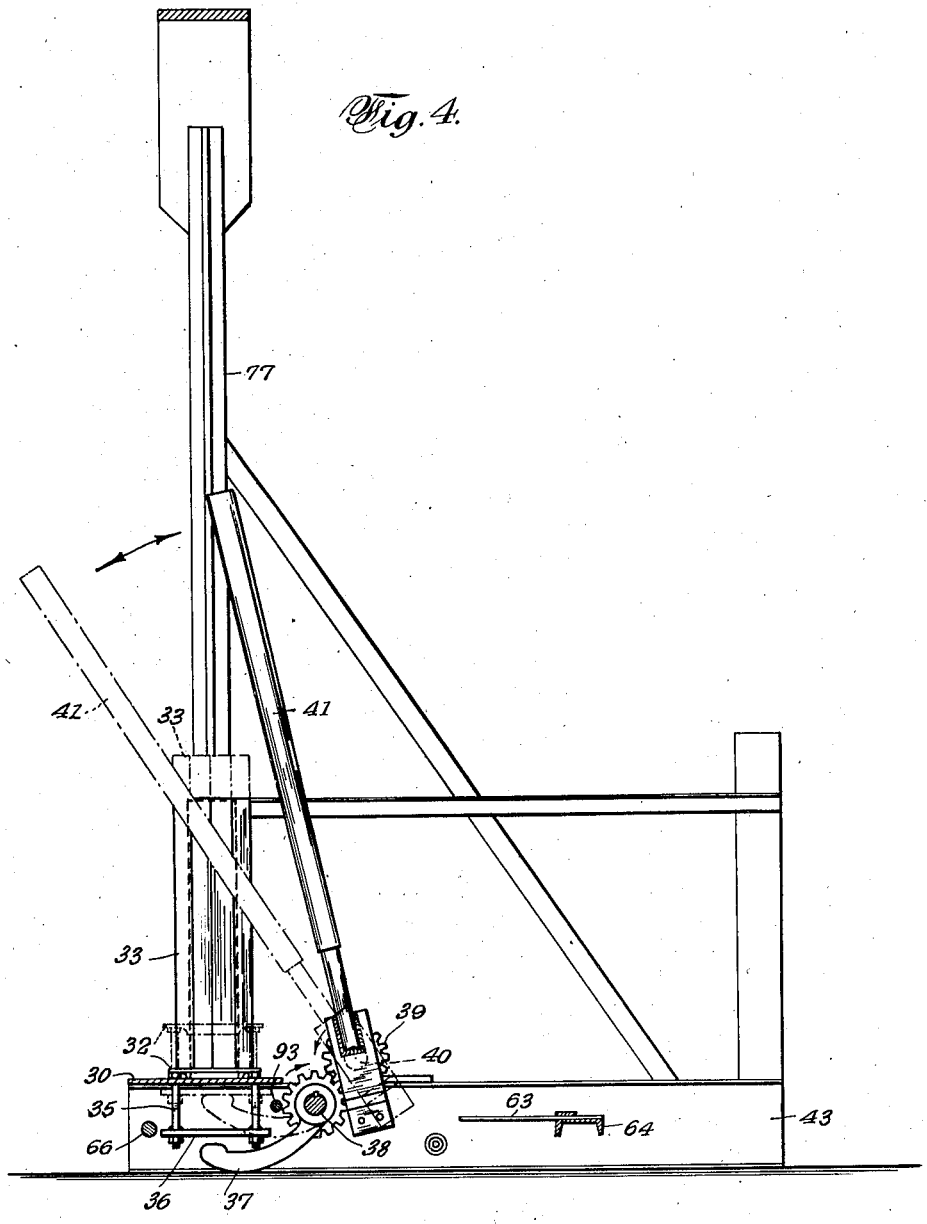

Jan. 2, 1940.　　K. KLEMSCHOFSKI ET AL　　2,185,597
MACHINE FOR THE MANUFACTURE OF POROUS PIPE
Filed July 10, 1937　　8 Sheets-Sheet 5
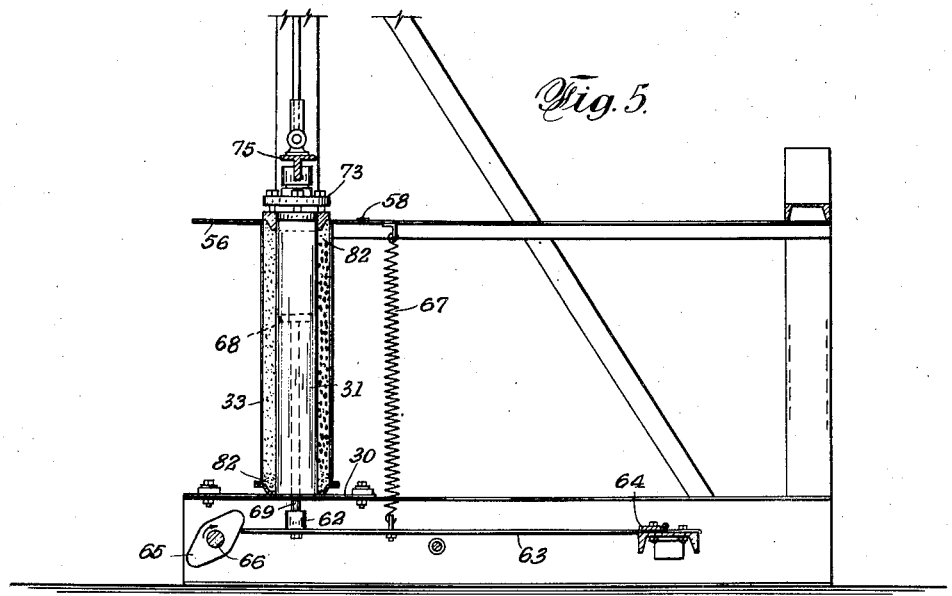
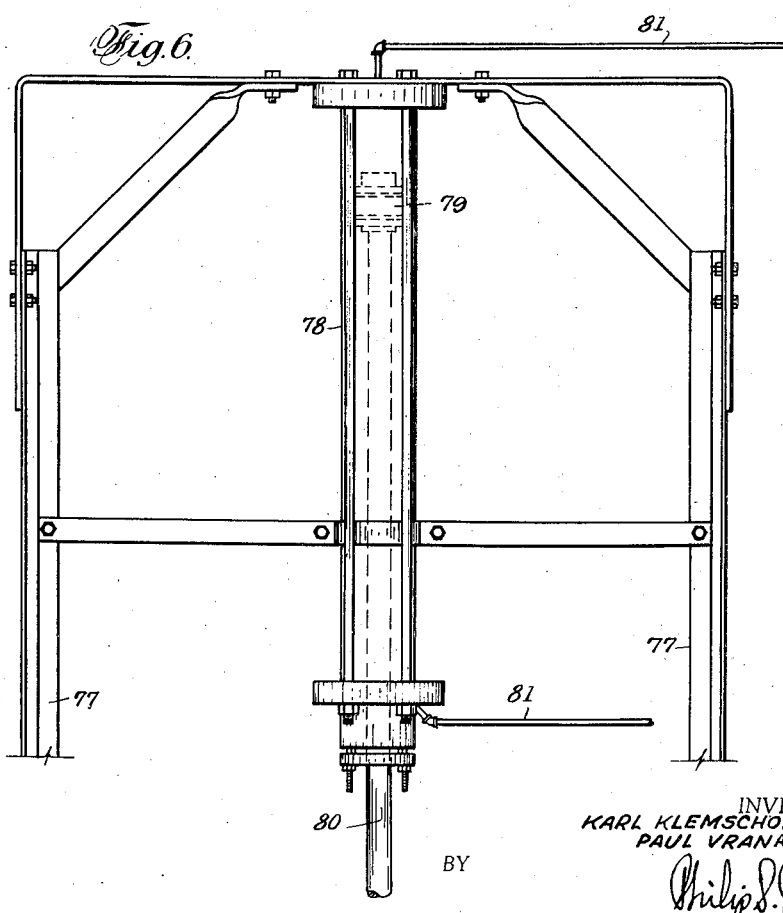
INVENTORS
KARL KLEMSCHOFSKI
PAUL VRANA
BY
ATTORNEY.

Jan. 2, 1940.  K. KLEMSCHOFSKI ET AL  2,185,597
MACHINE FOR THE MANUFACTURE OF POROUS PIPE
Filed July 10, 1937  8 Sheets-Sheet 6
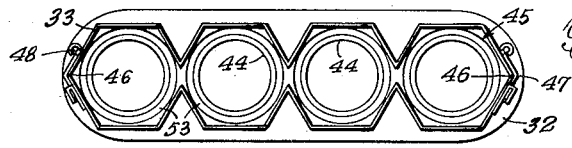
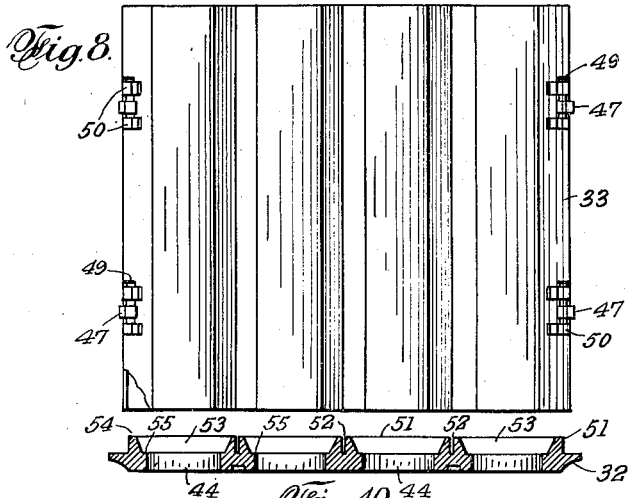
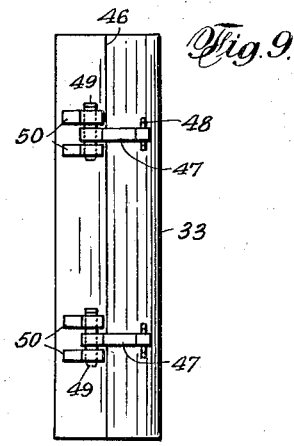
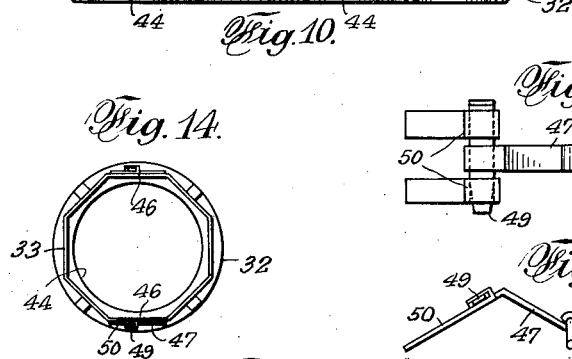
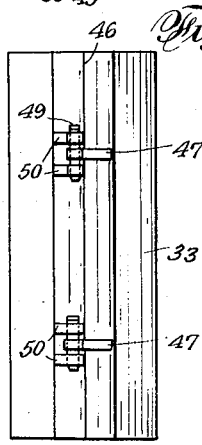
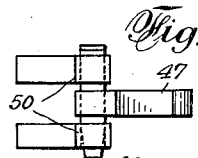
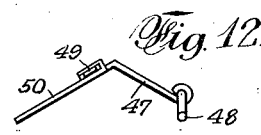
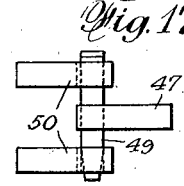
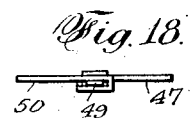
INVENTORS
KARL KLEMSCHOFSKI
PAUL VRANA
BY
ATTORNEY.

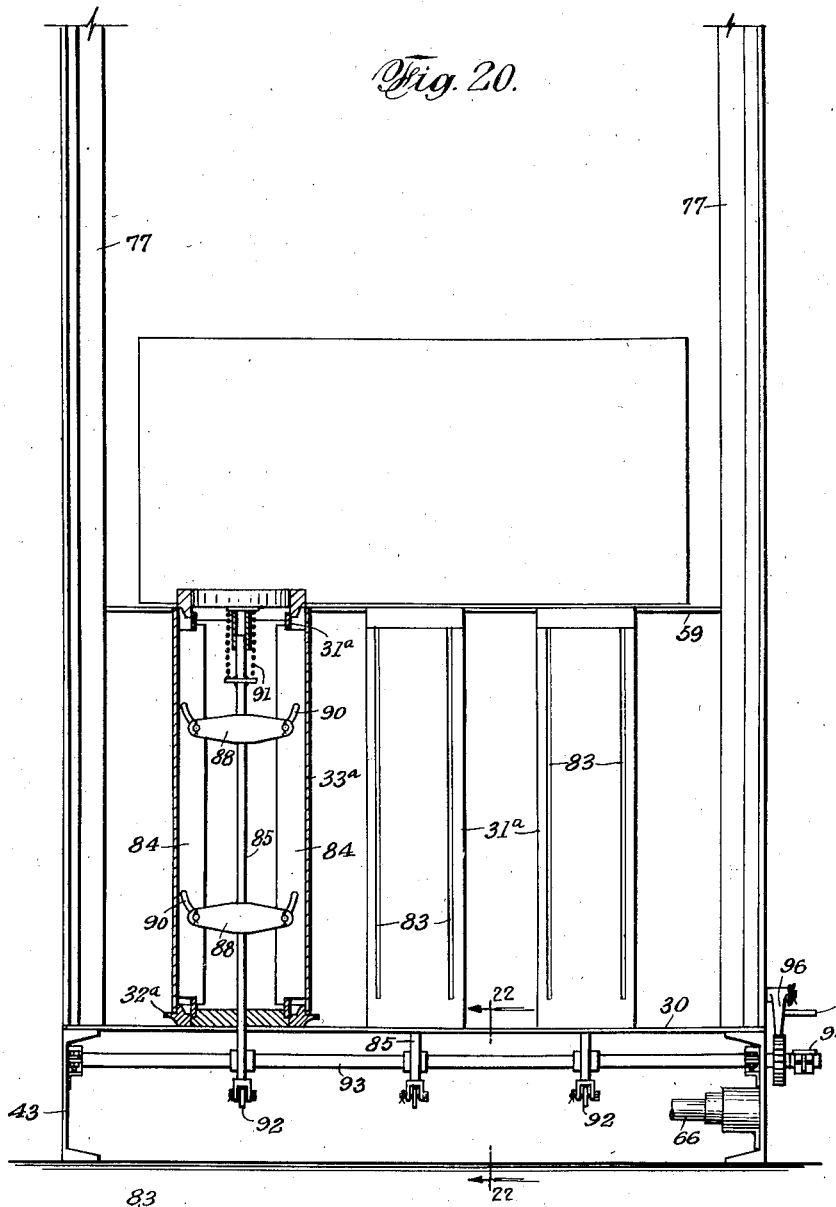
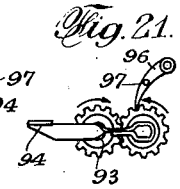
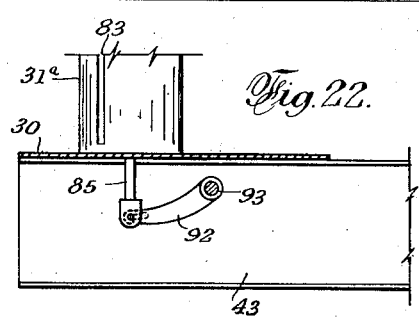

Jan. 2, 1940. K. KLEMSCHOFSKI ET AL 2,185,597
MACHINE FOR THE MANUFACTURE OF POROUS PIPE
Filed July 10, 1937 8 Sheets-Sheet 8
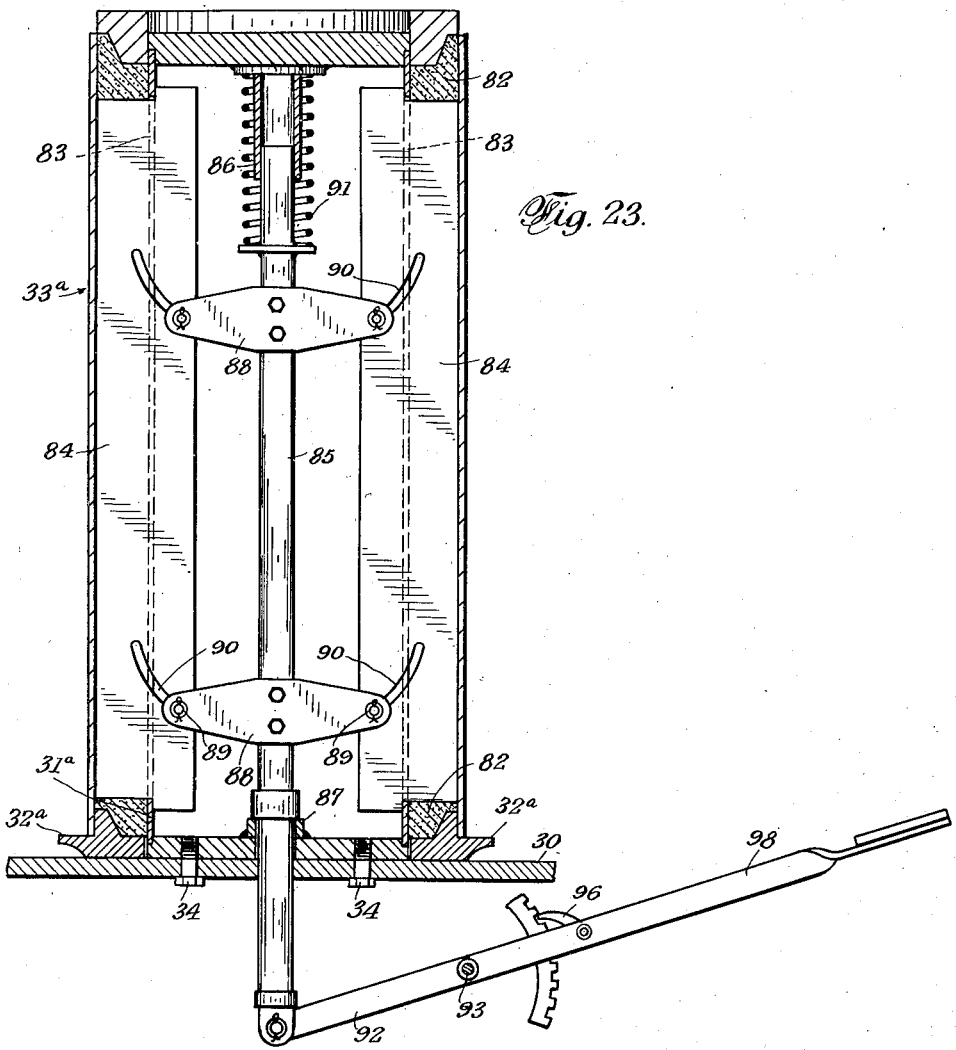
INVENTORS
KARL KLEMSCHOFSKI
PAUL VRANA
BY
ATTORNEY.

Patented Jan. 2, 1940

2,185,597

UNITED STATES PATENT OFFICE 2,185,597

MACHINE FOR THE MANUFACTURE OF POROUS PIPE

Karl Klemschofski, Little Ferry, and Paul Vrana, West New York, N. J.

Application July 10, 1937, Serial No. 152,908

7 Claims. (Cl. 25—30)

The invention herein disclosed relates to the manufacture of porous pipe and articles of a more or less similar nature.

Particular objects of the invention are to provide practical and efficient mechanism for the rapid economical manufacture of porous pipe and the like, and which will produce articles such as pipe, tile and blocks having a desired degree of porosity, with the strength and durability required for the uses to which said articles are to be put.

Other objects and the novel features of invention by which said objects are attained are set forth and will appear in the course of the following specification.

The drawings accompanying and forming part of the specification illustrate certain practical embodiments of the invention. Various modifications and changes may be made within the scope of the invention as will be clear from the broad intent of the claims.

Fig. 3 is a broken cross-sectional view, with the mold supporting base removed to expose the mold hammers, this view in general being taken as on the plane of line 3—3 of Fig. 1.

Fig. 4 is a part sectional view on a reduced scale as taken generally on the plane of line 4—4 of Fig. 1.

Fig. 5 is a broken vertical sectional view through one of the individual molds, as on substantially the plane of line 5—5 of Fig. 1.

Fig. 6 is a broken front view illustrating details of the power cylinder for effecting the raising and lowering of the mold top.

Figs. 7, 8 and 9 are top, side and end views respectively of the multiple type form of mold side walls.

Fig. 10 is a longitudinal sectional view of the corresponding mold bottom or pallet.

Figs. 11, 12, 13 are detail views of the latch construction for securing the mold sections together.

Figs. 14 and 15 are plan and end views of a larger, single pipe mold casing and Fig. 16 is a cross-sectional detail of the cooperating pallet.

Figs. 17, 18, 19 are detail views of the lock mechanism for this sectional form of mold.

Fig. 20 is a broken vertical sectional and front view illustrating the substitution of molds having collapsible separator plates for casing pipe with sections of different composition or porosity.

Fig. 21 is a detail of the separator collapsing mechanism.

Fig. 22 is a broken sectional detail as on line 22—22 of Fig. 20.

Fig. 23 is a vertical sectional enlarged view illustrating details of the separator form of mold with a modified form of actuating means.

Fig. 24 is a plan view of the mold core and separator blade construction.

Figure 1:
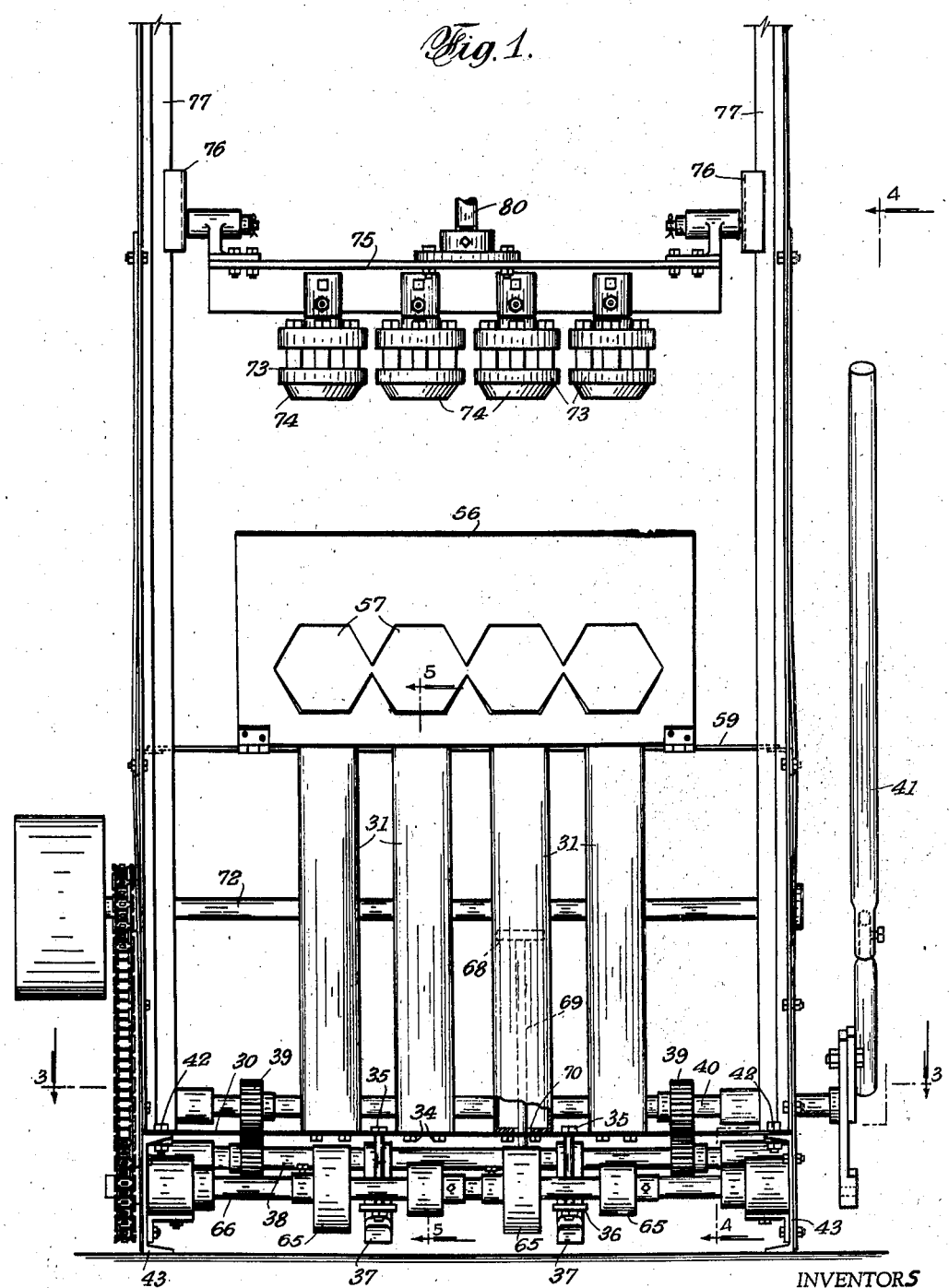
Fig. 1 is a broken front elevation of one form of the machine, shown with the mold top lifted, the mold removed from over the cores and the hinged portion of the table thrown back as required, to permit such removal.
Figure 2:
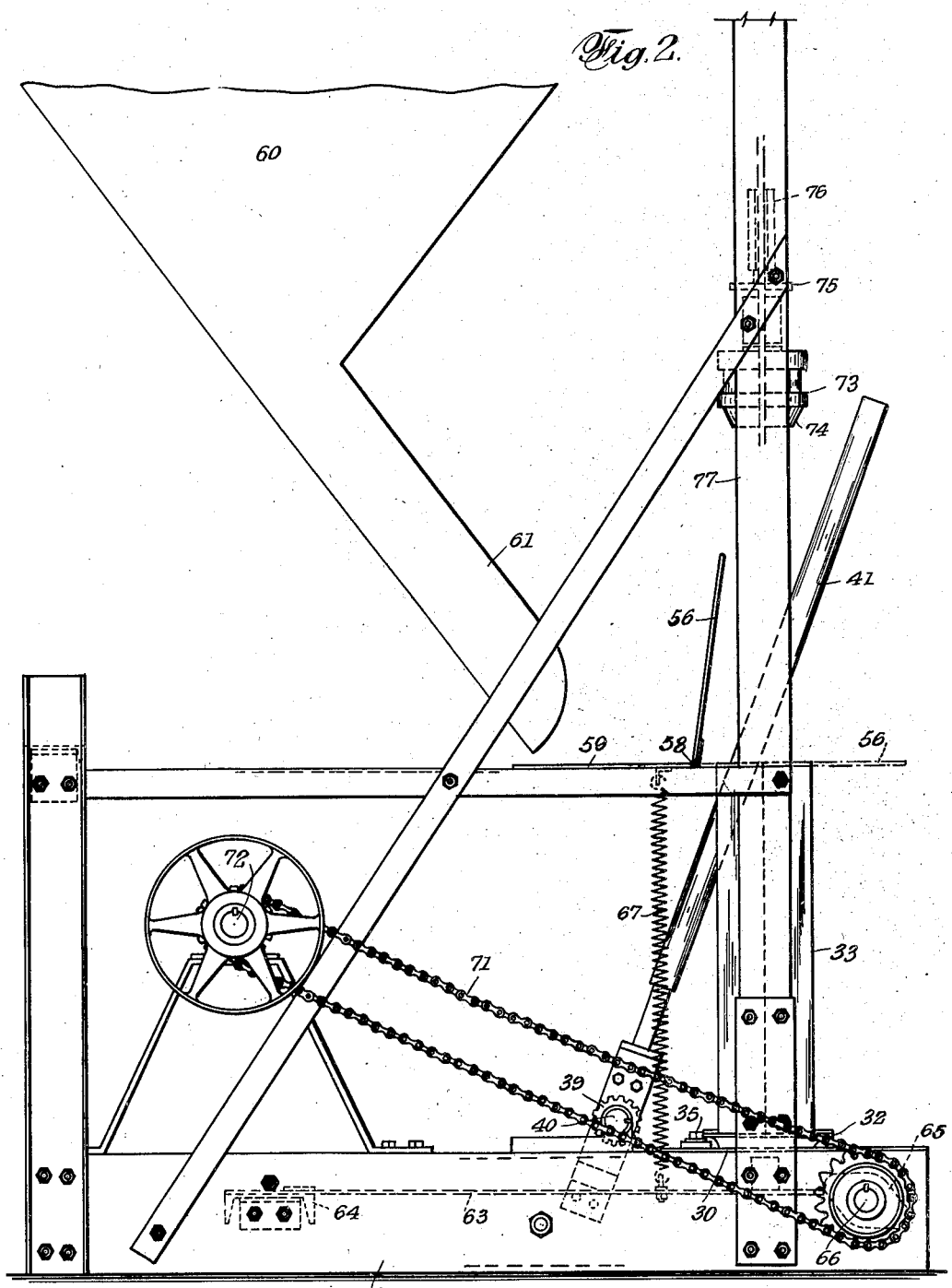
Fig. 2 is a broken side elevation of the machine.

Referring first to Figs. 1 and 2, the machine is shown as consisting of a supporting plate 30, of relatively heavy sheet metal, carrying fixed mold cores 31, the removable mold bottom or pallet 32 and the mold casing or sectional side wall 33. The mold cores are indicated as of hollow tubular form removably secured on the securing plates by bolts 34. The pallets are shown as let down over the cores and resting on the supporting plate in position to be raised by the bolts or studs 35, which project up through this plate from the yoke bars 36, which latter are positioned for engagement by lifter arms 37, on a rock shaft 38. This shaft is shown as connected by gears 39, with a shaft 40, operable by hand lever 41.

The mold supporting plate 30, is shown as secured at its ends at 42, on the upper flanges of the channels 43, forming the sides of the machine base.

In this first illustrated embodiment of the invention, a four pipe mold is shown with four cores secured in spaced relation on the mold plate, with the pallet having four passages 44, for these cores and the mold casing 33, as having four forms 45, Figs. 7, 8, 9, 10, for the exterior walls of the pipe. These mold sides are shown as made in two sections parting on the central line at 46, and removably secured together at the ends by links 47, hinged to one side wall section at 48, and removably held by slide bolts 49, operating in guides 50, on the companion wall section. These slide bolts may be in the form of taper keys or wedges to draw the mold wall sections together.

The pallet is shown in Fig. 10 as having raised mold seats 51, separated by slots 52, which receive and position the lower ends of the mold side wall sections.

In this first illustrated form, the mold is designed for forming pipe like that disclosed in copending patent application Ser. No. 141,518, with hexagonal external shape, cylindrical interior and interlocking shouldered and bevelled ends. Accordingly, the side wall members are shaped to provide hexagonal forms 45, and the mold seats 51 of the pallet have hexagonal external contours to fit the side wall sections and cylindrical bevelled seats 53, with shoulders 54, 55, at opposite ends of such bevels.

At the top, the sectional mold sides are confined and positioned by a downwardly hinging plate 56, Figs. 1 and 2, formed with hexagonal openings 57, to fit over the upper ends of the mold sides. This mold confining plate is shown as hinged at 58, to the edge of a table 59, onto which the concrete from hopper 60, is delivered through a chute or trough 61.

To agglomerate and compact the material in the mold cavities to a desired extent, hammer mechanism is provided consisting in the present disclosure of hammer elements 62, carried by spring bars 63, and which as shown particularly in Fig. 5, are each anchored at one end at 64, in position for engagement at the opposite end by a cam 65, on shaft 66. These cams are arranged to depress the free ends of the hammer bars, against the action of the lifting springs 67. The hammer elements are shown as located centrally of the cores, so that force of the blows will be distributed more or less uniformly throughout each individual mold.

In addition to the hammer action against the bottom of the mold plate, the interior of the mold cores may be directly impacted as by the hammer discs 68, Fig. 5, carried by rods 69, screwed into the hammer elements 62, and projecting up through openings 70, provided in the mold plate. These hammer discs are made sufficiently smaller than the core interiors, so that they will strike vertical glancing blows against the cores without impeding the hammer action against the bottom of the mold plate.

Drive of the cam shaft 66 is effected in the illustration by chain and sprocket connections 71, from a power shaft 72.

The bevelled and shouldered mold seats 53, 54, 55, in the pallet form the shouldered conical projecting ends of the pipe. Complementary shouldered conical sockets are formed in the opposite ends of the pipe by the mold tops 73, Fig. 1, having the bevelled and shouldered portions 74, to enter the top of the mold cavities as in Fig. 5, and thereby to produce sockets in the upper end of the molded pipe corresponding to the projecting rims formed at the lower end of the pipe.

All four mold tops 73, are shown as carried by a bar 75, provided with slides 76, operating over the vertical guides 77. This mold top assembly may be raised and lowered by hand, but in the illustration, a power cylinder 78, Fig. 6 is provided, containing a piston 79, having a rod 80, connected to bar 75. Available actuating fluid such as air, water or steam, suitably controlled may be admitted to and discharged from the power cylinder from connections indicated at 81, for raising and lowering the mold top unit.

To provide smooth finish for the fitted, interlocking ends of the pipe and to prevent adhesion with the mold surfaces at the ends of the pipe, special end mixtures may be used in the molds, as disclosed in copending application Ser. 141,518 and as indicated in Fig. 5, where such special end mixture is shown in the bottom and in the top of the mold at 82. As disclosed in the application referred to, this end mixture may contain finer materials than the body of the pipe and a small proportion of mineral oil and which in addition to giving a desired smoothness at the ends, enables the mold tops to come away from the ends of the molded pipe without sticking to or breaking the molded surfaces.

The mold cores are readily removable from the supporting plate 30, so that other sizes, shapes or numbers of cores may be quickly substituted. For the larger size pipe, individual molds may be used, for example, such as illustrated in Figs. 14 to 19, where, except for the individual character and octagonal shape of the mold, the structure is generally the same and corresponding reference characters are accordingly employed.

The machine is adapted for molding pipe with sections of different consistency by substituting molds with separators, such as shown in Figs. 20 to 23. These also may be multiple pipe molds as in Fig. 20, which shows a three mold construction or single molds as shown in Fig. 23.

In general, the separator molds are the same as described, including a core 31a, having a base secured at 34, on the mold supporting plate 30, and having a pallet 32a, with a mold side wall 33a, fitting over the same. The mold core however is slotted in its sides at 83, to pass the separator plates or blades 84, which when projected, engage inner opposite surfaces of the mold side wall and when retracted are flush with the outer surface of the cores.

The means for projecting and retracting the separator blades are shown as vertical shafts 85, operating in guides 86, 87, in the tops and bottoms of the mold cores and having transverse arms 88, carrying pins or guide rolls 89, engaged in cam slots 90, in the blades. Springs are shown at 91, for thrusting the shafts 85, downward to expand or project the separator blades and the reverse blade retracting movement of the shafts is effected by levers 92, connected with the lower ends of the shafts. When there are a number of molds as in Fig. 20, these levers may all be mounted on a single rock shaft 93. This is shown as operated from a foot pedal 94, geared to said shaft by the pinions 95, Fig. 21. The pawl 96, is shown for engagement with one of the gears for securing the rock shaft in the position holding the separator blades retracted. This pawl is shown provided with a kick pin 97, by which it may be released to permit the shaft to drop back for expanding the separator blades.

For the larger size molds, such as indicated in Figs. 23 and 24, a single foot pedal 98, or equivalent, may be provided for operating the separator blades in each individual mold.

Usually, the machine will be built so that single and multiple molds may be readily substituted and molds with and without the separator blades, in accordance with production requirements.

Operation

Molds of the multiple type, such as shown in detail in Figs. 7 to 10, are made up by lowering the pallet 32, down over the cores 31, Fig. 1, then locating the side wall member 33, over the pallet as in Fig. 2, and finally lowering the hinged top 56, down into positioning engagement over the upper end of the side wall as in dotted lines Fig. 2.

If end joint mixture is to be used, a small quantity of this is first filled into the bottom of the mold up to a height such as indicated at 82, Fig. 5. Then the regular concrete mixture is admitted on top of this and finally at the top another small batch of the end joint mixture is added, as at 82 in Fig. 5.

After the mold is filled or prior thereto, the hammering action may be started. The mold tops 73 may be lowered to completely close the mold Fig. 5, as soon as the mold is fully filled and pressure in the power cylinder may be left on while the hammering action is going on, thus enabling the mold top to follow the material down and firm it to the extent desired. The vibrating spring hammers 62, strike the mold supporting plate 30, centrally beneath the cores 31, assuring even tamping action at each individual mold and producing a substantially uniform composition. The hammering on the interior of the mold core accomplished with the hammer discs 68, further assures desired uniformity and firmness of composition. The following down of the mold top during the hammering, tamping operation further assures uniformity of product and a desired finishing off of the material at the top end of the mold. The special joint mixture with the small proportion of oil within it, enables the mold top to lift away without breaking or cracking the molded material.

After the mold top is raised and the top plate 56 thrown back, the hand lever 41 is rocked to raise the pallet as in Fig. 4 and thus break the molded material away from the core. Then the pallet may be lifted by hand or by power, for example by suitable connections from the power cylinder 72. The sectional side wall member may then be opened up by releasing the slide bolts 49, Fig. 9, and the molded pipe sections be left on the pallet for drying and curing.

Operation with the single molds such as illustrated in Figs. 14, 15, 16, is substantially the same, the mold top following down as the tamping proceeds and the mold being thereafter opened by raising the top, throwing back the cover plate, raising the pallet to effect separation from the core and then lifting the pallet up over the core.

In using the separator forms of molds such as shown in Figs. 20 to 24, the molds are filled with the separator blades extended, the materials of different composition or porosity being loaded into the mold at opposite sides of the projected blades. Before the hammering operation is started, the separator blades are retracted so that during the tamping, the two classes or grades of material will weld together across the dividing lines. The blades when retracted as by operation of the foot pedals 94 or 98, Figs. 20 and 23 are secured so by the holding pawls 96, after which the mold may be opened and separated as previously described.

In the multiple type of mold illustrated particularly in Figs. 7, 8 and 10, where the mold forms are coextensive, the pipe sections will be molded with connecting fins, so that in a four section mold such as illustrated, the pipe will come out of the mold as a single unit, consisting of four sections of pipe connected by webs or fins along opposing corner edges. This is an advantage for handling shipment and storage purposes and in many instances, the pipe may be laid in these multiple unit sections. These connecting webs are easily broken, so that the pipe sections may be readily separated. This is another advantage of the angular sided form of pipe as distinguished from the ordinary cylindrical form of pipe, since the mold can be made up so that the angular edges of adjoining sections of pipe will meet to form a web which is indented at opposite sides and hence can be easily broken. The separable sides of the sectional mold wall 45 as shown in Fig. 7 approach but do not meet to form these indented connecting fins and these sides are held against spreading by their engagement in the slots 52, in the pallet at the bottom and by the restraining effect of the movable table section 56 at the top.

What is claimed is:

1. A two-composition porous pipe mold, comprising a tubular mold core slotted in opposite sides, separator blades collapsible in said tubular core and extensible through said slots, a pallet at the foot of said core and removable over the top of the same and a mold side wall positioned on said pallet and engageable by said separator blades when the latter are extended.

2. A combination as in claim 1, with a slide rod operable in said tubular core, means engaged therewith for reciprocating the same and cam connections between said slide rod and separator blades for effecting the extension and retraction of the same in the reciprocation of said slide rod.

3. A combination as in claim 1, with a slide rod operable in said tubular core, means engaged therewith for reciprocating the same, cam connections between said slide rod and separator blades for effecting the extension and retraction of the same in the reciprocation of said slide rod and releasable means for retaining said separator blades in the retracted position inside the core to permit removal of the pallet over the core.

4. In a machine of the character disclosed, a mold pallet having a row of core receiving openings and holding and positioning grooves extending between said openings toward each other from opposite sides of said pallet, a mold wall consisting of separable opposite side sections with opposite wall portions extending inwardly toward each other from the opposite sides of the pallet entered in said grooves and providing a plurality of mold cavities connected by constricted connecting web forming channels, said sections of said mold wall entered in said positioning slots to hold said separable sections against spreading at the bottom, movable confining means for holding said mold sections against spreading at the top and a row of cores extending through said core openings in the pallet.

5. In a machine of the character disclosed, the combination of a machine frame, a shaft rotatably mounted on the base portion of said frame, a mold vibrating arm actuated from said shaft, a mold supporting plate mounted on the base portion of the frame above said mold vibrating arm, a mold core supported and secured on said plate above said mold vibrating arm, a mold pallet removably supported on said plate about said core and removable upwardly over said core, a sectional separable mold side wall removably supported on said pallet about said core, a power cylinder mounted on the frame above said mold structure, a piston operating in said power cylinder and a mold top connected with said piston and adapted to be adjustably lowered thereby into cooperative relation with said mold core and mold side wall.

6. In a machine of the character disclosed, the combination of a machine frame, a shaft rotatably mounted on the base portion of said frame, a mold vibrating arm actuated from said shaft, a mold supporting plate mounted on the base portion of the frame above said mold vibrating arm, a mold core supported and secured on said plate above said mold vibrating arm, a mold pallet removably supported on said plate about said core and removable upwardly over said core, a sectional separable mold side wall removably supported on said pallet about said core, a power cylinder mounted on the frame above said mold structure, a piston operating in said power cylinder, a mold top connected with said piston and adapted to be adjustably lowered thereby into cooperative relation with said mold core and mold side wall and to be lifted clear of the mold structure and means mounted in the base portion of the frame for positively lifting the pallet up over the mold core.

7. In a machine of the character disclosed, the combination of a machine frame, a shaft rotatably mounted on the base portion of said frame, a mold vibrating arm actuated from said shaft, a mold supporting plate mounted on the base portion of the frame above said mold vibrating arm, a mold core supported and secured on said plate above said mold vibrating arm, a mold pallet removably supported on said plate about said core and removable upwardly over said core, a sectional separable mold side wall removably supported on said pallet about said core and means on said frame for positively lifting said mold pallet off said supporting plate and in respect to the mold core fixedly supported on said plate.

KARL KLEMSCHOFSKI.
PAUL VRANA.